Figure 1:
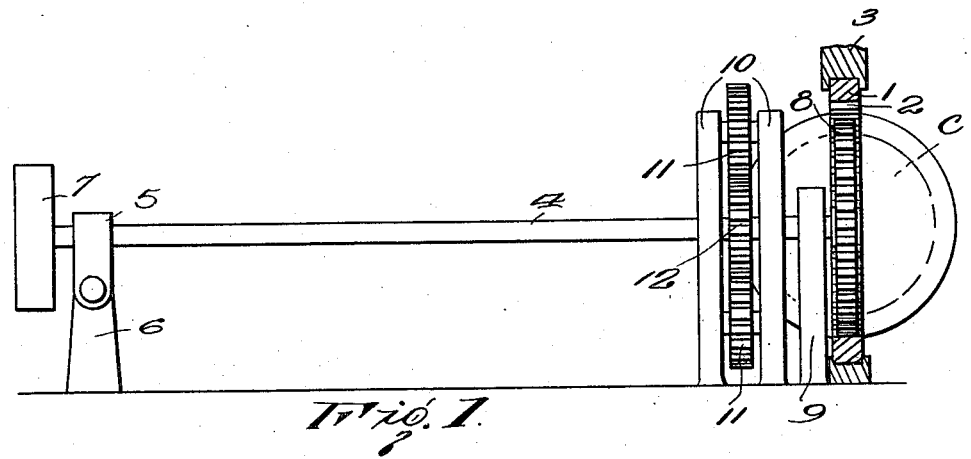

A. R. ENGLERT.
MECHANICAL MOVEMENT.
APPLICATION FILED APR. 20, 1918.

1,277,887.

Patented Sept. 3, 1918.

Arthur R. Englert
Inventor

By Geo. P. Kimmel
Attorney

UNITED STATES PATENT OFFICE.

ARTHUR R. ENGLERT, OF MILL HALL, PENNSYLVANIA.

MECHANICAL MOVEMENT.

1,277,887.  Specification of Letters Patent.  Patented Sept. 3, 1918.

Application filed April 20, 1918. Serial No. 229,745.

*To all whom it may concern:*

Be it known that I, ARTHUR R. ENGLERT, a citizen of the United States, residing at Mill Hall, in the county of Clinton and State of Pennsylvania, have invented certain new and useful Improvements in Mechanical Movements, of which the following is a specification.

This invention relates to improvements in mechanical movements and it is the principal object of the invention to provide a novel power transmission gearing for engines of the reciprocatory piston type, whereby greater working strokes by the pistons of the same will be permitted and as a consequence, allowing more power to be obtained with but a minimum fuel consumption.

A more specific object of the invention is to provide a form of gearing which will impart a continuous rotary motion to a driven element from a reciprocating driving element, means being provided for causing shifting of the driven element into engagement with the opposite sides of the driving element upon the reversal of movement thereof.

Other objects will be in part obvious and in part pointed out hereinafter.

In order that the invention and the manner of its application may be readily understood by those skilled in the art, I have in the accompanying illustrative drawings and in the detailed following description based thereon set forth a preferred embodiment of the invention.

Figure 2:
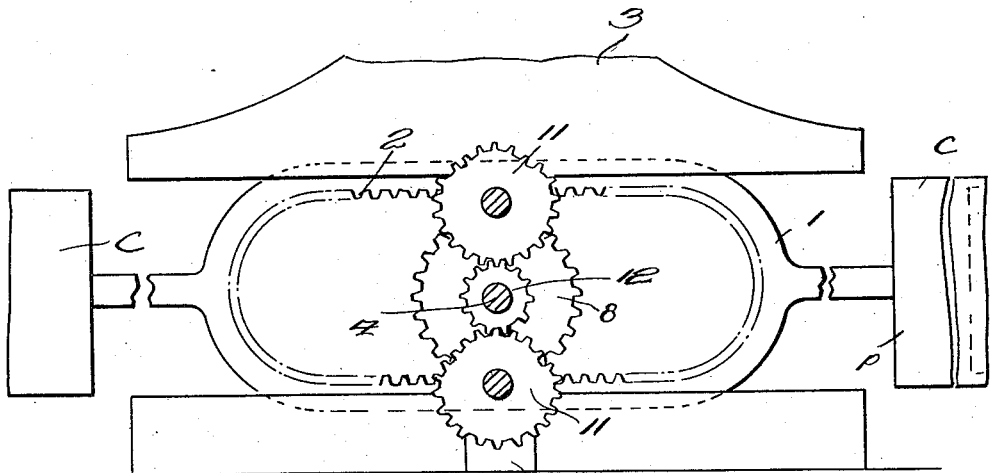

In the drawings:

Figure 1 is a vertical transverse section through the driving element of the improved mechanical movement showing the driven element and the shifting means therefor in elevation, and Fig. 2 is a fragmentary detail, partly in section, showing the engagement of the driven element with the driving element and the means for shifting the same alternately.

Having more particular reference to the drawings, in connection with which like reference characters will designate corresponding parts throughout the several views, $c$ represents the cylinder of an engine, it being understood in this connection that two of the same are provided and are arranged in oppositely disposed relation; the pistons $p$ working therein having the outer ends of the rods thereof connected by a yoke member 1, the adjacent surfaces of the opposite sides of which are provided with gear teeth indicated by the numeral 2. To support the yoke member 1 during the reciprocating motion thereof, the usual form of guides 3 are arranged adjacent the opposite sides thereof.

Disposed at substantially right angles to the yoke member 1 is a driven shaft 4, one end of which is mounted in a pivotal bearing 5 carried upon the upper end of a standard 6 and carries a pulley wheel 7, while the opposite end is arranged at a point in proximity to the yoke member and has a gear 8 mounted thereon adapted for alternate engagement with the opposite toothed sides of the yoke member 1. A standard 9 is positioned adjacent the guides 3 and has a slotted bearing formed in its upper end for slidably receiving the adjacent portion of said driven shaft therethrough, while other standards 10 are arranged in proximity thereto and are provided with alined openings for permitting the passage of the driven shaft therethrough. Irregular gears 11 are rotatably mounted between the several standards 10 at points in proximity to the opposite extremities thereof and mesh with a pinion 12 fixedly mounted on the adjacent portion of the driven shaft 4. In this connection, it is to be noted that the irregular gears 11 are so positioned as to cause the raising and lowering of the pinion 12 during their rotation, by reason of the irregular peripheral surfaces thereof.

In operation, charges of motive fluid are admitted to the opposed cylinders $c$ in the usual manner, thus causing working impulses to be alternately transmitted to the several pistons $p$, thereby reciprocating the yoke or looped member 1. Therefore, since the gear 8 is engaged at all times with the teeth of the yoke member 1 it necessarily follows that rotary motion will be imparted thereto and to the driven shaft 4. As the working stroke of one piston $p$ is imparted to the yoke member 1 and said yoke member is about to be reversed due to the transmission of the working stroke of the second piston $p$ thereto, the irregular gears 11 will act upon the pinion 12 carried on the driven shaft 4 in a manner to raise the same out of engagement with the lower toothed side of the yoke member 1 over the curved toothed ends thereof into engagement with the upper toothed side. Consequently, a continuous rotary motion will be imparted to the gear 8 and the driven shaft 4, thereby materially increasing the power of an engine provided therewith and requiring but a minimum fuel consumption to accomplish the same. Obviously, due to the mounting of the driven shaft 4 in the pivotal bearing 5, vertical movement of the same during the shifting of the gear 8 to the upper and lower sides of the yoke member 1 will be permitted without affecting the transmission of power therefrom by way of the pulley wheel 7.

Manifestly, the construction shown is capable of considerable modification and such modification as is within the scope of my claims, I consider within the spirit of my invention.

I claim:

1. In combination with a driving element consisting of a yoke member, a pivotally supported shaft arranged at substantially right angles thereto, a driven element on the shaft, and means connected to said driven element for alternately moving the same into engagement with the opposite sides of the driving element.

2. In combination with a driving element consisting of a yoke member having series of teeth formed upon the adjacent faces of the opposite sides thereof, a pivotally supported shaft arranged at substantially right angles to the said yoke member, a gear on the shaft, and means connected to said gear for alternately moving the same into engagement with the opposite toothed sides of the driving element.

3. In combination with a reciprocal driving element consisting of a yoke member having the adjacent faces of the opposite sides thereof toothed, a pivotally supported shaft arranged at substantially right angles thereto, a driven element on the shaft, a gear on the shaft, and irregular gears supported in proximity to said shaft and engaged with said first gear for causing the driven element to be alternately engaged with the opposite sides of the driving element.

In testimony whereof, I affix my signature hereto.

ARTHUR R. ENGLERT.

Copies of this patent may be obtained for five cents each, by addressing the "Commissioner of Patents, Washington, D. C."